United States Patent [19]
Burgess

[11] Patent Number: 5,772,218
[45] Date of Patent: *Jun. 30, 1998

[54] UNIFORM COMPRESSION GLAND SEAL ASSEMBLY

[75] Inventor: Kevin Edward Burgess, Carlingford, Australia

[73] Assignee: Warman International Limited, Artarmon, Australia

[*] Notice: The term of this patent shall not extend beyond the expiration date of Pat. No. 5,642,892.

[21] Appl. No.: 764,352

[22] Filed: Dec. 12, 1996

Related U.S. Application Data

[63] Continuation of Ser. No. 525,703, Mar. 10, 1994, filed as PCT/AU94/00115 published as WO94/20758 Sep. 15, 1994, abandoned.

[30] Foreign Application Priority Data

Mar. 12, 1993 [AU] Australia .............................. PL7757/93

[51] Int. Cl.[6] ..................................................... F16J 15/18
[52] U.S. Cl. .......................... 277/516; 277/520; 277/521
[58] Field of Search .................................. 277/59, 60, 64, 277/68, 69, 72 R, 104, 105, 130, 131, 165, 186

[56] References Cited

U.S. PATENT DOCUMENTS

| | | |
|---|---|---|
| 681,813 | 9/1901 | Ries . |
| 1,834,190 | 12/1931 | Timbs . |
| 1,947,257 | 2/1934 | Fritz et al. . |
| 2,049,774 | 8/1936 | Hoffman . |
| 2,322,679 | 6/1943 | Williamson . |
| 2,386,898 | 10/1945 | Karassik . |
| 2,448,147 | 8/1948 | Jacobson . |
| 2,845,286 | 7/1958 | Case et al. . |
| 2,881,710 | 4/1959 | McLean . |
| 3,847,453 | 11/1974 | Herbert . |
| 3,874,679 | 4/1975 | Kaller . |
| 3,947,157 | 3/1976 | Sadler et al. . |
| 4,204,689 | 5/1980 | Johansson . |
| 4,623,152 | 11/1986 | St Jean . |
| 4,717,160 | 1/1988 | Zitting et al. . |
| 4,965,409 | 10/1990 | Lindroos . |
| 5,609,468 | 3/1997 | Burgess . |
| 5,642,892 | 7/1997 | Burgess .................................. 277/105 |

FOREIGN PATENT DOCUMENTS

| | | |
|---|---|---|
| 748903 | 7/1933 | France . |
| 346038 | 12/1921 | Germany . |
| 859859 | 8/1952 | Germany . |
| 2600002 | 7/1977 | Germany . |
| 1-150074 | 6/1989 | Japan . |
| 288940 | 4/1928 | United Kingdom . |
| 471341 | 9/1937 | United Kingdom . |

*Primary Examiner*—Scott Cummings
*Attorney, Agent, or Firm*—Darby & Darby

[57] ABSTRACT

A gland seal assembly for a slurry pump comprising a main body having a bore therethrough for receiving a rotatable shaft, a packing receiving zone within the bore, the packing including at least two packing rings and a packing sleeve surrounding the packing rings and arranged so that axial compression of the packing sleeve can be translated at least in part, to radial compression of the packing rings.

12 Claims, 4 Drawing Sheets

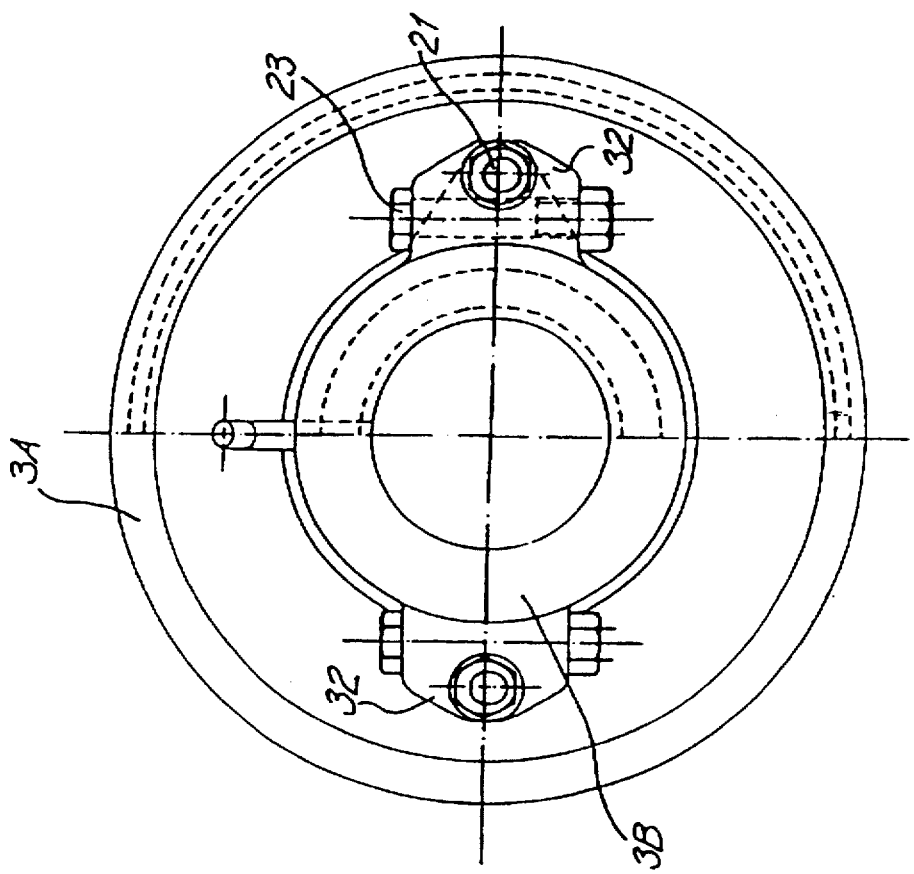
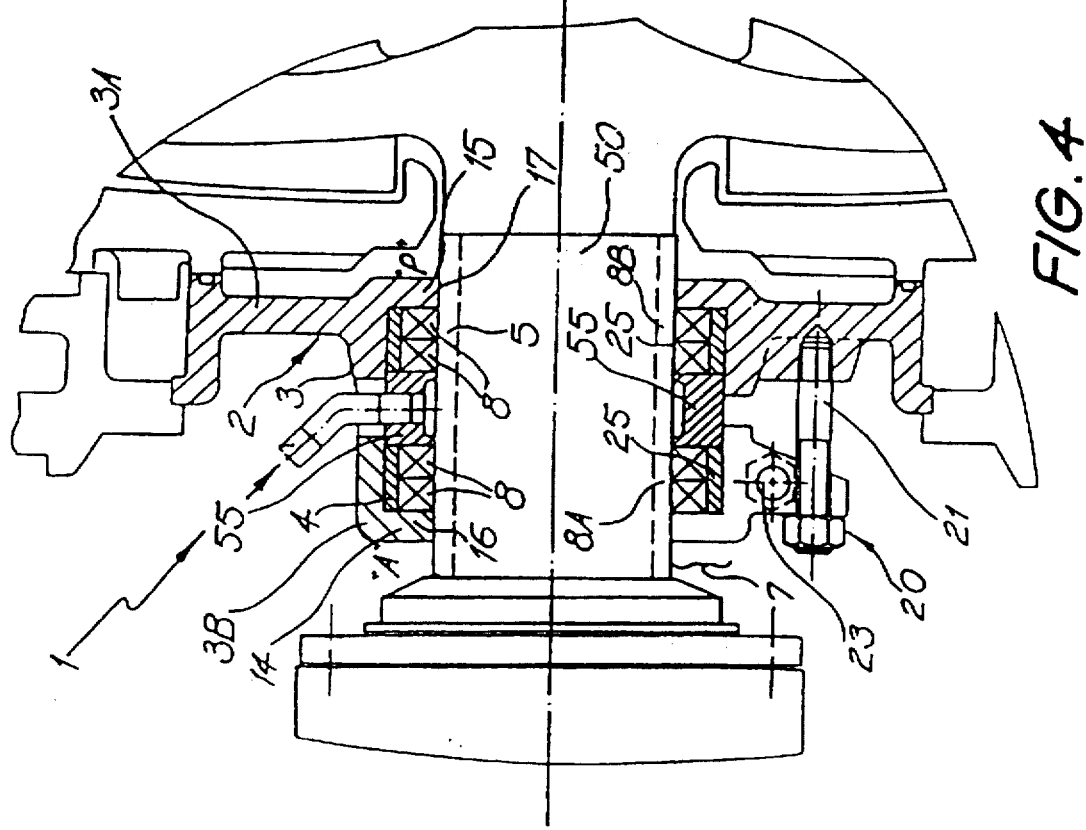

UNIFORM COMPRESSION GLAND SEAL ASSEMBLY

This a continuation of application Ser. No. 08/525,703, filed as PCT/AU94/00115, Mar. 10, 1994, published as WO94/20758, Sep. 15, 1994, now abandoned.

This invention relates generally to seal assemblies for pumps and more particularly, though not exclusively, to seal assemblies for centrifugal slurry pumps.

Gland seal assemblies have been used on centrifugal water and slurry pumps for many years. Typical conventional gland assemblies are shown in FIGS. 1, 2 and 3. FIGS. 1, 2 and 3 are partial schematic sectional elevations of conventional gland seal assemblies. Such assemblies generally consist of an outer housing 2 which is normally called the stuffing box, with a cylindrical bore 4 through which passes a rotatable shaft 50 which may for example be, a pump shaft. An end wall 35 is disposed at one end of the bore. Shaft 50 may or may not have a protective sleeve t hereon. The annular gap 7 between the bore 4 and the shaft 50 is typically filled with packing 5 which may be in the form of a number of packing rings 8. The packing material can vary depending upon the application but is normally woven from fibres in a square or rectangular section which c an be cut into annular rings. Materials are chosen for strength and other lubricants (such as PTFE) may be added to reduce friction.

Packing 5 is normally placed into the housing or stuffing box and compressed from the outside end by a gland 9. Due to the compressibility of the packing 5 this allows the gap between the packing 5 and shaft (or its sleeve) 50 to be adjusted by moving the gland 9 into and out of the annular gap 7 forming a packing space. External bolts (not shown) normally permit this adjustment to be effected. Adjusting the gap 7 between the stationary packing 5 and the rotating shaft 50 allows the leakage from the assembly to be regulated. This leakage may in certain applications be critical to ensure proper cooling of the packing and shaft and to remove the heat generated by friction.

Sealing assemblies of this type when used for water pumps can utilise the pumped liquid that leaks from the sealing assembly during operation to help cool the assembly. Adequately lubricated assemblies are necessary for a long life.

Slurry pumps offer an additional problem because the slurry being pumped contains particles. These particles cause additional friction and wear to the packing and sleeve. For slurry pumps it is common practice to inject clean sealing water from an external supply into the assembly to reduce these problems and ensure a long life. The water is injected into the assembly via a feed channel 14 to a lantern ring assembly 10. The lantern ring assembly may comprise a lantern ring 11 and a restrictor 12. In FIG. 1 the restrictor 12 is formed of metal and in FIG. 2 it is a non-metallic device. In FIG. 3 there is a lantern ring 11 which is spaced from a neck ring 15 by a packing 80. The lantern ring and lantern restrictors direct the water introduced via channel 14 into a gap around the shaft or sleeve thereon. This allows water into the critical gap between the packing 5 and the shaft 50 for proper and effective lubrication. Both lantern ring and lantern ring restrictor arrangements allow some sealing water to flow into the pump. This has the desired effect of flushing solids or particles away from the sealing assembly, hence minimising the risk of slurry contamination into the gland.

Such conventional arrangements described above have inherent problems in there design as well as causing operational and maintenance problems for slurry pumps. For example, such arrangements generally result in lack of uniform squeeze on each packing ring. High pressure exacerbates this problem. Typically one or two packing rings will be squeezed by the gland more than the others leading to uneven sealing and wear. Furthermore, water usage varies a lot depending on operator adjustment, the types of packing used and other variables. Some processes rely on drying the solids being pumped in the slurry by removing the water. Hence, any additional water used presents a high cost in later processing stages. A further problem is associated with operators who do not always make proper adjustments. Water supply can be variable or even fail leading to wear and failure of the packings and sleeve. Water can also leak around the outside instead of the inside of the diameter of the packings.

The present invention seeks to alleviate one or more of the aforementioned problems associated with conventional sealing assemblies.

According to the present invention there is provided a gland seal assembly suitable for use in a slurry pump which comprises a main body having a bore therethrough for receiving a rotatable shaft, a packing receiving zone within the bore, a packing including at least two packing rings and a packing sleeve surrounding the packing rings and arranged so that axial compression thereof can be translated at least in part to radially compression onto the packing rings.

Preferably, the packing sleeve comprises an elastomeric ring disposed between the packing rings and the inner surface of the bore. In one form of the invention the packing sleeve may comprises an outer rim wall of generally annular configuration. In another form the packing sleeve may comprise an outer rim wall with a radially inwardly extending side wall at one end of the rim wall. In the assembled position the side wall may extend down one side of the packing.

In one preferred form, two groups of packing rings are provided each group having associated therewith one of the aforementioned packing sleeves. The groups of packing rings may be spaced from one another by a lantern ring assembly or the like. In one preferred arrangement the lantern ring comprises a first portion which fits between the two groups of packing rings and a second portion configured so as compress the packing sleeves when in the mounted position. There may further be provided an O-ring or like element providing a seal between the lantern ring and the housing.

The housing may be of any suitable construction. For example, the housing may comprise a main body having a bore therethrough for receiving a rotatable shaft. The main body may include first and second parts each having a packing receiving zone within the bore. Each of the first and second parts include an abutment wall which forms an end wall of the packing receiving zone. There is a further adjustment means which is operable to cause relative movement between the abutment walls in the axial direction of the bore.

The packing receiving zone may comprise the annular region or gap between the inner wall surface of the bore and the outer surface of the rotatable shaft when in the assembled position.

Each abutment wall may comprise a flange extending generally radially inward with respect to the inner wall surface of the bore. Preferably, the abutment flanges are formed on the first and second parts of the housing. When in the assembled position these abutment walls are remote from one another. The bore in each part of the housing may open towards one another and may be slightly spaced apart so as to receive a lantern ring assembly therebetween.

Preferably, each of the abutment flanges has a free inner edge which is disposed adjacent the surface of the shaft when in the assembled position and can function on its own and/or in association with neck rings as would a restrictor. Advantageously, a plurality of packing rings are disposed within each part of the housing.

One part of the housing is preferably secured to the pump casing with the other part being operatively connected thereto so that it can move axially relative to that first mentioned section as a result of operation of the adjustment means.

The adjustment means may be in the form of a plurality of threaded bolts interconnecting the first and second parts of the housing so that rotation thereof causes the axial movement of the two parts. Furthermore, at least one of the parts of the housing comprises two sections interconnected by bolts and arranged so that the two parts can be separated to facilitate ease of access and dismantling of the housing.

Preferred embodiments of the invention will hereinafter be described with reference to the accompanying drawings.

In those drawings:

FIG. 4 is a schematic partial side elevation of a gland seal assembly according to the present invention;

FIG. 5 is a front elevation of the gland seal assembly shown in FIG. 4;

Figure 1:
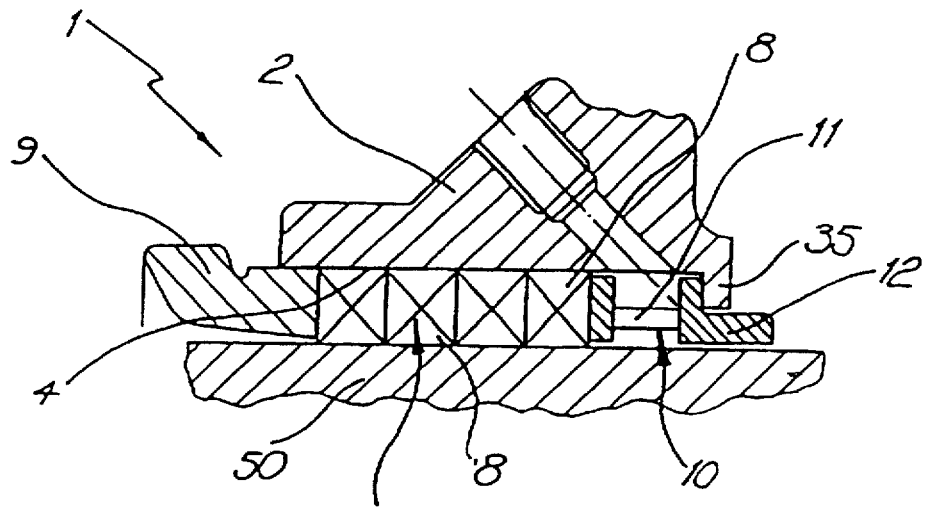
FIGS. 1-3 are partial schematic sectional elevational views of conventional gland assemblies of the prior art.
Figure 2:
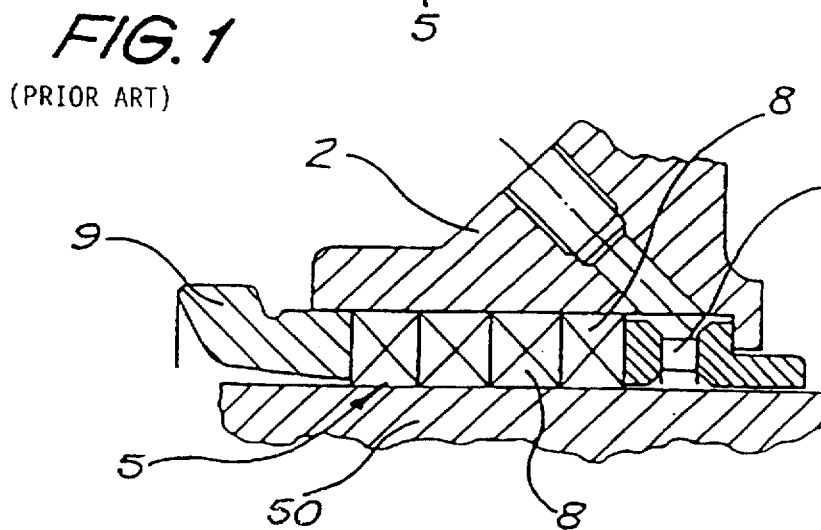
Figure 3:
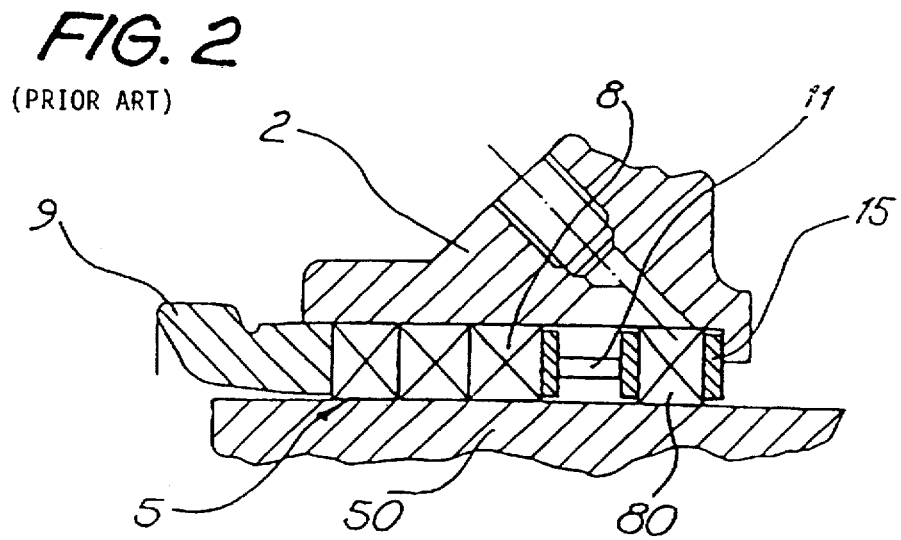

Referring to FIGS. 4 and 5, it can be seen that the assembly of the present invention comprises certain features similar to conventional seal assemblies and where possible like reference numerals have been used to described like parts. The aim of any sealing assembly for a pump is in essence, to contain the pressurised pump fluid. Pressure is broken down by the sealing assembly so that pressure is at atmosphere outside the seal.

The sealing housing or stuffing box 2 has a bore 4 essentially parallel to the rotatable shaft 50 and forms an annular chamber 7. The housing 2 comprises a main body 3 comprising a first part 3A and a second part 3B. Abutment walls in the form of flanges 14 and 15 are provided, each having an inner edge 16 and 17. The inner diameter of the stuffing box comes into a diameter close to the shaft. The edges 16 and 17 are arranged on their own and/or in association with neck rings so as to act as a restrictor gap to assist water flushing away slurry. The abutment walls 14 and 15 also forms a shoulder to support the packings 5. The housing or stuffing box would normally be metallic, although other suitable materials could be used. It may be possible to produce the part from a low wearing material such as High Chrome Iron as it is subject to wear by the slurry.

The shaft 50 would typically be protected by a hard metallic or coated sleeve to minimise wear.

The two parts 3A and 3B of the housing body 3 are arranged such that adjustment means in the form of bolts 21 permit the position of the two housing parts to be adjusted axially relative to one another and thus, varying the compression on the packings 5 and hence controlling the gap between the packings and sleeve or shaft and consequently the leakage in the seal assembly. The bolts 21 are carried on flanges 32 on housing parts 3B.

The arrangement is different to a conventional gland as the abutment walls do not enter the bore of the housing. Instead they form an annular seal chamber on the inside diameter. As shown housing part 30 is split into halves and fastened together by securing bolts 23. Part 3A may also be similarly split. During maintenance the housing parts can be split and removed from around the shaft 50 thus allowing easier access to the housing.

A lantern ring 55 separates the two ends of the housing parts 3A and 3B. Its outer diameter locates into both the housing or stuffing box and the bore diameters to ensure and maintain concentricity. Typically, the lantern ring would be metallic but could have coatings or inserts on the inside diameter to minimise wear on the shaft or sleeve. A radial hole and annular groove on the inside diameter permits water to be injected into the critical packing/shaft or sleeve gap on both sides of the lantern ring. Thus, water can flow both into the pump and also to the outside.

The new arrangement would utilise any of the conventional packing types. These are normally a woven ring cut through in one location to allow installation around the shaft sleeve. The number of packings 8 can vary at either end. As shown two packings are provided at each end.

Figure 6:
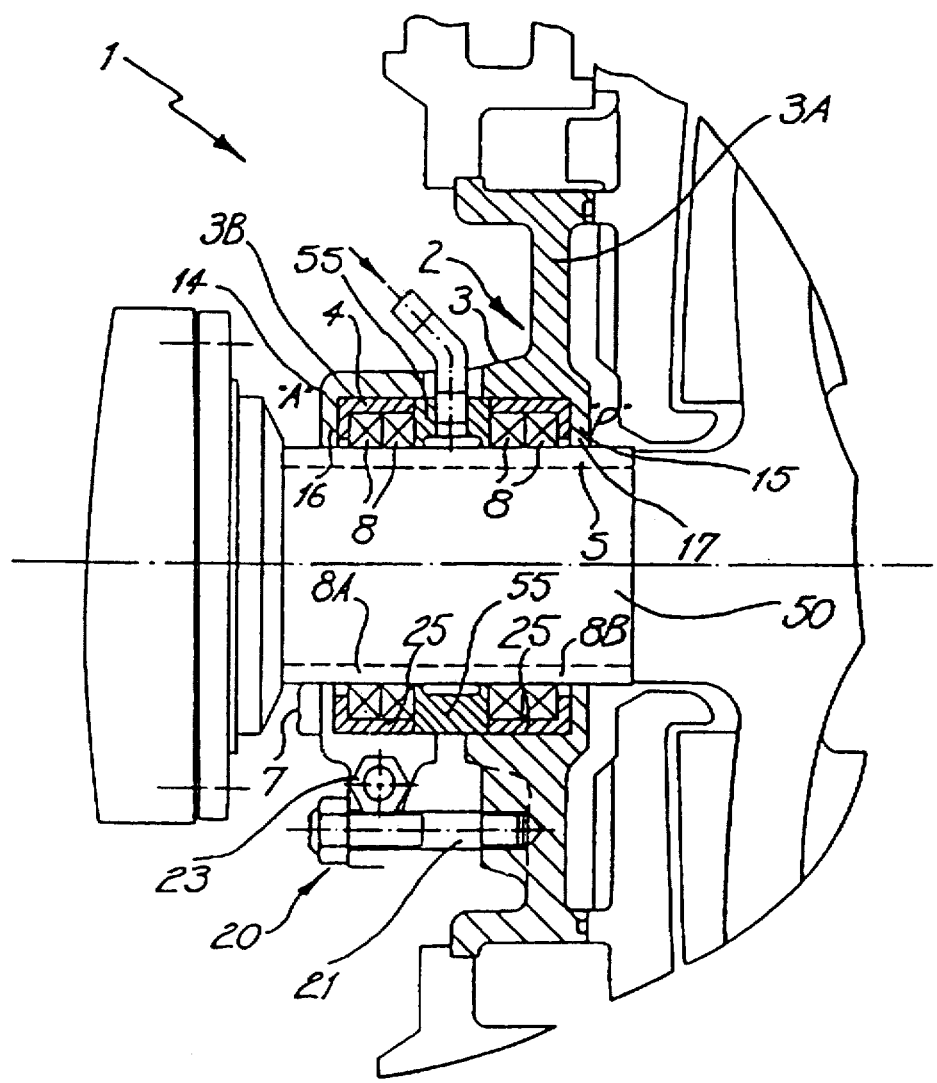
FIG. 6 is a similar view to that of FIG. 4 showing a modified form of assembly according to the invention.

As shown in FIGS. 4 and 6, packing sleeves 25 are incorporated around the packings coat either end of the sealing assembly. Two packing sleeves 25 are shown each being associated with a respective group of packing rings 8A and 8B. These packing sleeves 25 have essentially elastomeric properties so that axial compression by relative movement between the two housing parts will at first squeeze these sleeves axially. The packing sleeves 25 shown in FIG. 4 are generally annular rings comprising an outer rim wall. Each of the packing sleeves shown in FIG. 6 comprises an outer rim wall and a side wall which extends radially inwardly from one end of the outer rim wall. In the assembled position the side wall of the sleeve is sandwiched between the abutment walls of the housing and the packing rings. In another arrangement not shown the side walls of the sleeves could be disposed adjacent the lantern ring assembly. As the sleeves are essentially trapped between the outer housing 3 and the packings 5, the axial compression will be translated to a radial compression onto the packings. The packings will therefore be compressed axially and radially and the compression will be more uniform from ring to ring. More uniform compression on each packing ring will provide a far better control over the sealing assembly and operation and leakage. The packing sleeves will also assist sealing around the outside of the packing rings and stop uncontrolled leakage.

Figure 7:
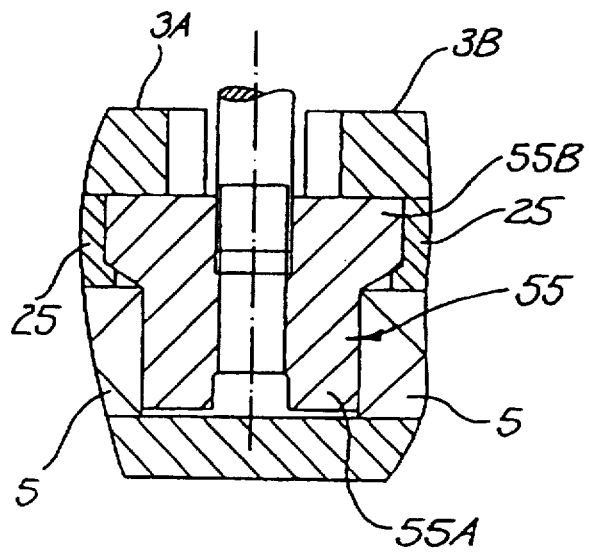
FIGS. 7 to 9 are side elevations of improved lantern rings which may form part of the gland seal assembly according to the invention.
Figure 8:
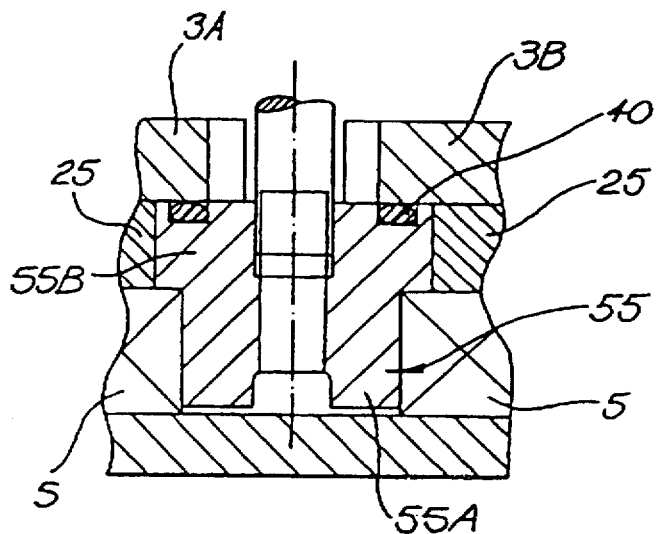
Figure 9:
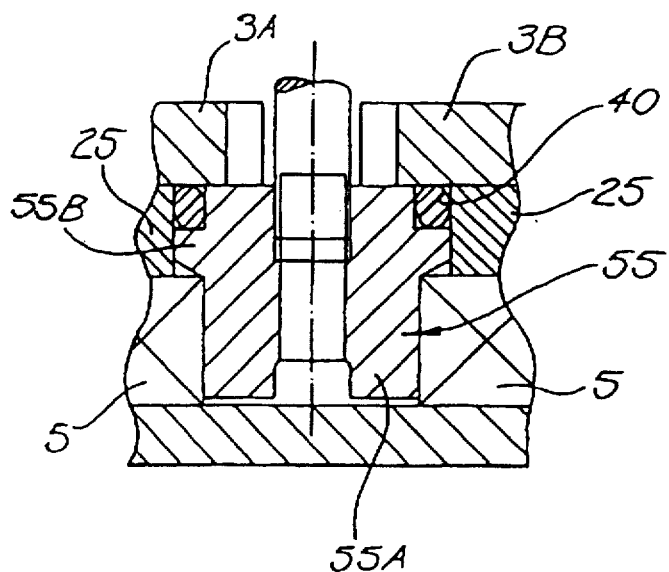

FIGS. 7 to 9 show various forms of lantern ring particularly suited for use with the gland seal assembly of the invention. In each case the lantern ring 55 comprises a first portion 55A which fits between the groups of packings 5 and an enlarged portion 55B which acts on the packing sleeves 25 to partially compress them.

In the embodiments shown in FIGS. 8 and 9 an O-ring 40 is fitted between the lantern ring 55 and the housing 3A/3B to provide for an additional seal.

The arrangement as described above in accordance with the preferred embodiment, there is provided better seal water control, reduced water usage, longer life and less slurry ingress, and wear is more even. Packing compression is uniform as evidenced by the fact that the shaft sleeve wear is spread out over all the rings of packings and not concentrated at one end as is normal in a "conventional" stuffing box design. Measured gland water injected into the gland can be lower than a "conventional" gland design without affecting the operation. The design also controls the amount of gland water that exits the gland, both into and out of the pump. In addition, the arrangement permits easier maintenance in that the packing rings are more accessible and the length of the fixed annular seal chamber is reduced.

Finally, it is to be understood that various alterations, modifications and/or additions may be incorporated into the various constructions and arrangements of parts without departing from the spirit or ambit of the invention.

I claim:

1. A gland seal assembly suitable for use in a slurry pump, the assembly including:
   a main body having a bore therethrough for receiving a rotatable shaft;
   a packing receiving zone within the bore;
   a packing including at least two groups of packing rings;
   a lantern ring disposed between at least two of the groups of packing rings;
   at least two packing sleeves, a single packing sleeve surrounding each respective group of packing rings, each packing sleeve comprising a single elastomeric ring disposed between the packing rings and the inner surface of the bore;
   means for applying a selected axial force to the packing sleeves in the general longitudinal direction of the shaft; and
   the arrangement being such that axial compression of the packing sleeves is translated at least in part into radial generally uniform compression onto and across the packing rings.

2. A gland seal assembly according to claim 1 wherein each of said packing sleeves comprises an outer rim wall of generally annular configuration.

3. A gland seal assembly according to claim 1 wherein each of said packing sleeve sleeves comprises an outer rim wall with a radially inwardly extending side wall at one end of the rim wall.

4. A gland seal assembly suitable for use in a slurry pump, the assembly including:
   a main body having first and second ends, a bore therethrough for receiving a rotatable shaft, and first and second abutment walls respectively adjacent the first and second ends and having edges that do not enter the bore, the main body further comprising first and second parts movable with respect to each other, the bore extending through each of the first and second parts of the housing, and the first and second abutment walls being associated with the first and second parts, respectively;
   a packing receiving zone within the bore;
   a packing positioned within the packing receiving zone, the first and second abutment walls forming a shoulder to support the packing, the packing including at least two groups of packing rings each group including at least two packing rings;
   a lantern ring disposed between at least two of the groups of packing rings;
   at least two packing sleeves, a single packing sleeve surrounding each respective group of packing rings, each packing sleeve comprising a single elastomeric ring disposed between the packing rings and the inner surface of the bore;
   means for applying a selected axial force to the packing sleeves in the general longitudinal direction of the shaft; and
   the arrangement being such that axial compression of the packing sleeves is translated at least in part into radial generally uniform compression onto and across the packing rings.

5. A gland seal assembly suitable for use in a slurry pump, the assembly including:
   a main body having first and second ends, a bore therethrough for receiving a rotatable shaft, and first and second abutment walls respectively adjacent the first and second ends and having edges that do not enter the bore, the main body further comprising first and second parts movable with respect to each other, the bore extending through each of the first and second parts of the housing, and an the first and second abutment walls being associated with the first and second parts, respectively;
   a packing receiving zone within the bore;
   a packing positioned within the packing receiving zone, the first and second abutment walls forming a shoulder to support the packing, the packing including at least two groups of packing rings each group including at least two packing rings;
   a lantern ring disposed between at least two of the groups of packing rings;
   packing sleeves, each packing sleeve surrounding a respective group of packing rings, each packing sleeve comprising an elastomeric ring disposed between the packing rings and the inner surface of the bore;
   means for applying a selected axial force to the packing sleeves in the general longitudinal direction of the shaft; and
   the arrangement being such that axial compression of the packing sleeves is translated at least in part into radial generally uniform compression onto and across the packing rings.

6. A gland seal assembly suitable for use in a slurry pump, the assembly including:
   a main body having first and second ends, a bore therethrough for receiving a rotatable shaft, an axially extending wall, and first and second radially inwardly extending abutment walls respectively adjacent the first and second ends, the main body further comprising first and second parts movable with respect to each other, the bore extending through each of the first and second parts of the housing, and the first and second abutment walls and an axially extending wall being associated with the first and second parts, respectively;
   a packing receiving zone within the bore of each of the first and second parts of the housing, the packing receiving zone being formed by the first and second abutment walls and the axially extending wall of the respective housing part;
   at least two packing groups of packing rings with a respective packing group positioned within each said packing receiving zone, each packing group including at least two packing rings, the first and second abutment walls and the axially extending walls forming a shoulder to support the packing group and to transmit forces uniformly to the packing group;
   a lantern ring disposed between at least two of the groups of packing rings;
   packing sleeves, each packing sleeve surrounding each respective group of packing rings, each packing sleeve comprising an elastomeric ring disposed between the packing rings and the inner surface of the bore;

means for applying a selected axial force to the packing sleeves in the general longitudinal direction of the shaft; and the arrangement being such that axial compression of the packing sleeves is translated at least in part into radial generally uniform compression onto and across the packing rings.

7. A gland seal assembly suitable for use in a slurry pump, the assembly including:

a main body having first and second ends, a bore therethrough for receiving a rotatable shaft, and first and second abutment walls respectively adjacent the first and second ends, the main body further comprising first and second parts movable with respect to each other, the bore extending through each of the first and second parts of the housing, and the first and second abutment walls being associated with the first and second parts, respectively, wherein no element of said first part of said housing enters said second part of said housing and no element of said second part of said housing enters said first part of said housing;

a packing receiving zone within the bore;

a packing positioned within the packing receiving zone, the first and second abutment walls forming a shoulder to support the packing, the packing including at least two groups of packing rings each group including at least two packing rings, the first and second parts of the housing being movable with respect to each other to compress the packing therein;

a lantern ring disposed between at least two of the groups of packing rings;

packing sleeves, each packing sleeve surrounding each respective group of packing rings, each packing sleeve comprising an elastomeric ring disposed between the packing rings and the inner surface of the bore;

means for applying a selected axial force to the packing sleeves in the general longitudinal direction of the shaft; and the arrangement being such that axial compression of the packing sleeves is translated at least in part into radial generally uniform compression onto and across the packing rings.

8. A gland seal assembly according to claim 7 wherein said lantern ring comprises a first portion which fits between said groups of packing rings and a second portion configured so as to compress said packing sleeves when in a mounted position.

9. A gland seal assembly according to claim 8 wherein there is further provided an O-ring or like element providing a seal between the lantern ring and the housing.

10. A gland seal assembly according to claim 7 wherein each of said packing sleeves comprises an outer rim wall of generally annular configuration.

11. A gland seal assembly according to claim 7 wherein each of said packing sleeve comprises an outer rim wall with a radially inwardly extending side wall at one end of the rim wall.

12. A gland seal assembly according to claim 7 wherein each said group of packing rings includes at least two packing rings.

* * * * *